US007009016B2

(12) United States Patent
Lee

(10) Patent No.: US 7,009,016 B2
(45) Date of Patent: Mar. 7, 2006

(54) DIELECTRIC THIN FILMS FROM FLUORINATED PRECURSORS

(75) Inventor: Chung J. Lee, Fremont, CA (US)

(73) Assignee: Dielectric Systems, Inc., Fremont, CA (US)

( * ) Notice: Subject to any disclaimer, the term of this patent is extended or adjusted under 35 U.S.C. 154(b) by 0 days.

(21) Appl. No.: 10/818,854

(22) Filed: Apr. 5, 2004

(65) Prior Publication Data

US 2004/0241345 A1   Dec. 2, 2004

Related U.S. Application Data

(62) Division of application No. 10/028,198, filed on Dec. 20, 2001, now Pat. No. 6,797,343.

(51) Int. Cl.
C08F 214/18 (2006.01)
B32B 27/28 (2006.01)

(52) U.S. Cl. ........................ 526/244; 526/251; 428/1.1; 428/421; 428/500

(58) Field of Classification Search ................ 526/244, 526/251; 428/1.1, 421, 500
See application file for complete search history.

(56) References Cited

U.S. PATENT DOCUMENTS

| | | | |
|---|---|---|---|
| 3,268,599 A | 8/1966 | Chow | |
| 3,274,267 A | 9/1966 | Chow | |
| 3,280,202 A | 10/1966 | Gilch | |
| 3,288,728 A | 11/1966 | Gorham | |
| 3,332,891 A | 7/1967 | Chow et al. | |
| 3,342,754 A | 9/1967 | Gorham | |
| 3,349,045 A | 10/1967 | Gilch | |
| 3,379,803 A | 4/1968 | Tittmann et al. | |
| 3,503,903 A | 3/1970 | Shaw et al. | |
| 3,509,075 A | 4/1970 | Niegisch et al. | |
| 3,626,032 A | 12/1971 | Norris | |
| 3,694,495 A | 9/1972 | Norris | |
| 3,940,530 A | 2/1976 | Loeb et al. | |
| 5,268,202 A | 12/1993 | You et al. | |
| 5,538,758 A | 7/1996 | Beach et al. | |
| 5,879,808 A | 3/1999 | Wary et al. | |
| 5,883,144 A | 3/1999 | Bambara et al. | |
| 5,958,510 A | 9/1999 | Sivaramakrishnam et al. | |
| 6,130,171 A | 10/2000 | Gomi | |
| 6,140,456 A | 10/2000 | Lee et al. | |
| 6,265,320 B1 | 7/2001 | Shi et al. | |
| 6,703,462 B1 | 3/2004 | Lee | |
| 6,797,343 B1 * | 9/2004 | Lee ........................... 428/1.1 |
| 2003/0143341 A1 | 7/2003 | Lee | |

FOREIGN PATENT DOCUMENTS

| | | |
|---|---|---|
| EP | 0349032 | 1/1990 |
| EP | 0523479 | 1/1993 |
| EP | 0856503 | 9/1998 |
| GB | 650947 | 3/1951 |
| GB | 673651 | 6/1952 |
| WO | WO 97/15699 | 5/1997 |
| WO | WO 97/15951 | 5/1997 |
| WO | WO 97/42356 | 11/1997 |
| WO | WO 99/21705 | 5/1999 |
| WO | WO 99/21706 | 5/1999 |
| WO | WO 99/21924 | 5/1999 |

OTHER PUBLICATIONS

Morgen et al., *Morphological Transitions in Fluorinated and Non-Fluorinated Parylenes*, Material Research Society Symposium Proceedings, vol. 565, pp. 297-302, 1999.
Peng and McGivern, *Quantum Yields and Energy Partitioning in the UV Photodissociation of Halon 2402*, Journal of Chemical Physics, vol. 113, No. 17, pp. 7149-7157, 2000.
Brun, *100nm: The Undiscovered Country*, Semiconductor International, p. 79, Feb. 2000.
Rashed, *Properties and Characteristics of Silicon Carbide*, website publication (www.poco.com), POCO Graphite Inc., 2002.
Chow et al., *Poly (a,a,a',a'-tetrafluoro-p-xylylene)*, Journal of Applied Polymer Science, vol. 13, No. 9, pp. 2325-2332, 1969.
Chow et al., *The Synthests of 1,1,2,2,9,9,10,10-octafluorou2, 2Paracyclophane*, Journal of Organic Chemistry, vol. 35, No. 1, pp. 20-22, 1970.
Iwamoto et al., *Crystal Structure of Poly-p-xylene. I. The a Form*, Jour. Polymer. Sci. Polymer. Phys. Ed., vol. 11, pp. 2403-2411, 1973.
Iwamoto et al., *Crystallization During Polymerization of Poly-p-xylene. III. Crystal Sturcture and Molecular Orientation as a Function of Temperature*, Journal of Polymer Science Polymer, Phys. Ed., vol. 13, pp. 1925-1938, 1975.
Lee, *Transport Polymerization of Gaseous Intermediates and Polymer Crystal Growth*, J. Marcromol. Sci. Rev. Micromol. Chem., C16(1), p. 79-127, 1977-78.

(Continued)

Primary Examiner—Robert D. Harlan
(74) Attorney, Agent, or Firm—Alleman Hall McCoy Russell & Tuttle LLP

(57) ABSTRACT

New precursors and processes are disclosed for making fluorinated, low dielectric constant ∈ thin films that have higher dimensional stability and are more rigid than fluorinated poly (para-xylylenes). The fluorinated, low dielectric constant thin films can be prepared from reactions of an ethylenic-containing precursor with benzocyclobutane-, biphenyl- and/or dieneone-containing precursors. The fluorinated, low dielectric constant thin films are useful for fabrications of future <0.13 μm integrated circuits (ICs). Using fluorinated, low-dielectric constant thin films prepared according to this invention, the integrity of the dielectric, copper (Cu) and barrier metals, such as Ta, can be kept intact; therefore improving the reliability of the IC.

19 Claims, No Drawings

OTHER PUBLICATIONS

Sharma et al., *Optimizing Poly(chloro-p-Xylelene) or Parylene C Synthesis*, Journal of Applied Science, vol. 36, No. 7, pp. 1555-1565, Sep. 20, 1988.

Lee, *Polyimides, Polyquinolines and Polyquinoxalines: Tg-Structure Relationships*, Journal of Macromolecular Science, Part C-Polymer Reviews (formerly *Journal of Macromolecular Science, Part C-Reviews in Macromolecular Chemistry and Physics*) vol. 29(4), pp. 431-560, 1989.

Lang, *Vapor Deposition of Very low k Polymer Films, Poly (Naphthalene), Poly (Fluorinated Naphthalene)*, Materials Research Society Symposium Proceedings, vol. 381, pp. 45-50, Apr. 17, 1995.

Wary et al., *Polymer Developed to be Interlayer Dielectric*, Semi-Conductor International, pp. 211-216, Jun. 1996.

Ryan et al., *Effect of Deposition and Annealing on the Thermomechanical Properties of Parylene Films*, Material Research Society Symposium Proceedings, vol. 476, pp. 225-230, 1997.

Greiner, *Poly(1,4-xylylene)s: Polymer Films by Chemical Vapour Deposition*, Trends in Polymer Science, vol. 5, No. 1, pp. 12-16, 1997.

Harrus et al., *Parylene Af-4: A Low $e_R$ Material Candidate for ULSI Multilevel Interconnect Applications*, Material Research Society Symposium Proceedings, vol. 443, 1997.

Plano et al., *The Effect of Deposition Conditions on the Properties of Vapor-Deposited Parylene Af-4 Films*, Material Research Society Symposium Proceedings, vol. 476, pp. 213-218, 1997.

Yang et al., *High Deposition Rate Parylene Films*, Journal of Crystal Growth, North Holland Publishing Co., Amsterdam, NL, vol. 183, No. 3, pp. 385-390, 1998.

Riedel, *Electro-less Nickel Plating $2^{nd}$ Edition*, ASM International Finishing Publication Ltd., 1998.

Mathur et al., *Vapor Deposition of Parylene-F Using Hydrogen as Carrier Gas*, Journal of Materials Research, vol. 14, No. 1, pp. 246-250, 1999.

Peng and McGivern, *Quantum Yields and Energy Partitioning In the UV Photodissociation of Halon 2402*, Journal of Chemical Physics, vol. 113, No. 17, pp. 7149-7157, 2000.

Brun, *100nm: The Undiscovered Country*, Semiconductor International, p. 79, Feb. 2000.

* cited by examiner

DIELECTRIC THIN FILMS FROM FLUORINATED PRECURSORS

CROSS-REFERENCE TO RELATED APPLICATION

This application is a divisional application of U.S. patent application Ser. No. 10/028,198, filed Dec. 20, 2001 now U.S. Pat No. 6,797,373, which is incorporated herein in its entirety for all purposes.

BACKGROUND

This invention relates to precursors and methods for making thin films that are useful for the fabrication of integrated circuits ("IC"). In particular, this invention relates to thin films that are created by polymerizing fluorinated ethylinic precursors with fluorinated benzocyclobutane precursors, fluorinated biphenyl or fluorinated dieneone precursors. The resultant thin films have increased compositional strength, a low-dielectric constant ("∈"), and are stable at high temperatures.

As integrated circuits ("ICs") have become progressively more microminiaturized to provide higher computing speeds, current dielectric materials used in the manufacturing of the ICs have proven to be inadequate in several ways. These materials, for instance, have high dielectric constants, difficulty to use in the manufacturing process, have inadequate thermal instability and generate of toxic by-products. ICs are made by depositing layers of elements and/or compounds on a semiconductor wafer using a variety of techniques that are well known in the art of fabricating such devices. Specialized material are used to isolate layers on the IC and reduce the charge (i.e. capacitance) that can be stored in between conducting elements of the IC. To reduce the potential capacitance in certain layers, it is preferable that the materials have a low dielectric constant ("∈"). Low dielectric constant materials can be deposited by a variety of methods, including spin-on and chemical vapor deposition (CVD). The composition and characteristics of the dielectric materials are determined from its precursors as well as the processes and reactions such precursors undergo while being integrated into the IC. As used herein, spin-on refers to the IC manufacturing process whereby the substrate is rotated about an axis perpendicular to its surface while, or immediately after, a coating material is applied to the surface. As ICs become smaller and more functional, a dielectric material with ∈ that is 2.7 or lower will be required.

Other properties such as thermal stability, compositional integrity and process compatibility are important factors that must be considered when integrating a dielectric material into an IC. For example, a dielectric material should retain its integrity during the processes involved in IC fabrication. These processes include reactive ion etching ("RIE") or plasma patterning, wet chemical cleaning of photoresist, physical vapor depositions ("PVD") of barrier materials and cap layers, electroplating and annealing of copper ("Cu") and chemical-mechanical polishing ("CMP") of copper. In addition, the dielectric should have sufficient dimensional stability. Interfacial stresses resulting from a coefficient of thermal expansion ("CTE") mismatch between the dielectric and barrier material should not induce structural failure of the barrier material during and after annealing of copper. In addition, the interfacial adhesion of dielectric and the other barrier material should be sufficient to overcome interfacial and shear stresses and warrant good adhesion after annealing and CMP of copper. Corrosive organic elements used for IC processing can cause interfacial corrosion of the barrier material, and it is essential that the dielectric material does not allow the organic elements to diffuse into the barrier material layer. In addition, to maintain its electrical integrity after fabrication of the ICs, the dielectric should be free from contamination by the barrier material. Furthermore, the interfaces of dielectric and the barrier material should be free from moisture and no ionic migration occurs when the ICs are operating under electrical bias.

Dielectric materials that have been traditionally used in ICs were either solid or porous thin films. There are advantages and disadvantages to each. For example, the advantages of solid dielectric materials include: higher dimensional and structural integrity and better mechanical strength than porous dielectric materials, but the disadvantage is higher dielectric constant. In contrast, the advantage of porous dielectric materials is lower dielectric constant due to the presence of air inside tiny pores of these materials. Current solid materials are unable to achieve stability, integrity and strength with a dielectric constant below 2.7.

The "solid" polymer films or "pin-hole free" films contain voids that can generally range between 3 to 5 volume % of the films. However, the average void sizes in a cross-section of a well prepared "pin-hole free" or "solid" films are only few Angstroms. It is critical that the pore sizes of the thin films be relatively small in order to be useful for fabrication of current or future generation of ICs. For example, the pore sizes should be less than the mean free path (i.e. 50 to 100 Angstroms) of the barrier material, which is typically Tantalum ("Ta").

The removal of solvents or sacrificing materials can result in additional porosity and low dielectric constant in "pinhole free" polymer films. However, when the sacrificing materials have different compatibilities with the polymer matrix, the result can lead to polymer aggregation and pore sizes larger than 100 Angstroms. The resulting thin film dielectric has poor mechanical properties due to localized degradation caused by large pores or their aggregates. The presence of pores in theses dielectric materials normally results in holes oh newly formed surfaces, thus making subsequent depositions of a continuous, thin <50–100 Å) barrier layers and copper seed layers very difficult if not impossible. Additional problems with traditional porous thin films are they often exhibit reliability problems due to the inclusion of barrier metal inside the dielectric layer, as occurs after PVD of Ta. Porous dielectric materials are also difficult to integrate into IC fabrications that involve a CMP process. To further complicate the process, large surface areas in porous films lead to high water adsorption that can limit the electrical reliability of the IC.

Precursors such as Bicyclobutene ("BCB") can be used to make thin films in a copper dual damascene structure without the need for a barrier layer such as Ta, however, the dielectric constant of BCB is greater than 2.7. Introduction of air bubbles into the BCB during the process can increases porosity and a consequential decrease of the dielectric constant. At 20% porosity, BCB has a dielectric constant of about 2.3. Unfortunately, the porous BCB and other dielectric materials that can achieve a ∈≦2.4 are too soft for CMP and not suitable for fabrication of current and future ICs.

Plasma polymerization of fluorinated precursor molecules has also been described. For example, Kudo et al., Proc. 3d Int. DUMIC Conference, 85–92 (1997) disclosed polymers made from $C_4F_8$ and $C_2H_2$ with a dielectric constant of 2.4. The polymers had a glass transition temperature ("Tg") of 450° C. However, despite its low leakage current due to presence of $sp^3C$—F bonds, a low thermal stability occurred due to presence of $sp^3C$—F and $sp^3C$-$sp^3$-C bonds in the films. Thus, these fluorinated polymers are unable to withstand the prolonged high temperatures necessary for IC manufacture. In addition, LaBelle et al, Proc, 3d Int. DUMIC Conference, 98–105 (1997) also described the use of $CF_3$—CF(O)—$CF_2$ precursors in a pulsed plasma CVD process, which resulted in some polymer films with a dielectric constant of 1.95. However, in spite of the low dielectric constant, these polymer films also had a low thermal stability due to presence of $sp^3C$-$sp^3C$ and $sp^3C$—F bonds in these films.

Other fluorinated compounds described by Wary et al, (Semiconductor International, June 1996, 211–216) used the dimer precursor, ($\alpha$, $\alpha$, $\alpha^1$, $\alpha^1$), tetrafluoro-di-p-xylylene (i.e. {—$CF_2$—$C_6H_4$—$CF_2$—}$_2$) and a thermal CVD process to manufacture Parylene AF-4™, which has the structural formula: {—$CF_2$—$C_6H_4$—$CF_2$—}$_n$. Films made from Parylene AF44™ have a dielectric constant of 2.28 and have increased thermal stability compared to the above-mentioned dielectric materials. Films made of Parylene AF-4™ lost only 0.8% of its weight over a 3-hour period at 450° C. under a nitrogen atmosphere. However, there are disadvantages to the known methods the manufacture of the fluorinated poly (para-xylylenes), or Parylene AF44™. First, the manufacture of their precursors is inefficient because the chemical reactions have low yields, and the process is expensive and produces toxic byproducts. Further, it is difficult to eliminate redimerization of the reactive intermediates. When deposited along with polymers, these dimers decrease the thermal stability and mechanical strength of the film.

In our co-pending applications, we have disclosed some pin-hole-free polymer dielectric that can be prepared from transport polymerization process. These dielectric materials consist of $sp^2C$—F and hyperconjugated $sp^3C$—F in their polymer chains, thus they have $\in \leq 2.4$, and they are thermally stable for fabrication of future ICs. Herein, we describe precursors and processes for making thin films from precursors that results in polymers with low dielectric constant, improved compositional strength and high temperature stability that should provide low cost alternatives for fabrication of miniaturized ICs.

SUMMARY

The present invention includes the polymerization of precursors for production of a dielectric thin film with physical properties that overcome the disadvantages of prior art. In particular, this invention relates to thin films that are created by polymerizing fluorinated ethylinic precursors with fluorinated benzocyclobutane, fluorinated biphenyl or fluorinated dieneone precursors. The resultant thin films have increased dimensional stability, a low-dielectric constant ("$\in$"), and are stable at high temperatures. The thin films described herein can be incorporated into the manufacturing process of integrated circuits, active matrix liquid crystal display or fiber optic devices. In addition to the disclosure of the precursors for the dielectric thin films, a spin-on method for producing dielectric thin films in the manufacturing process is also discussed. Other objects, aspects and advantages of the invention can be ascertained from the review of the detailed disclosure, of the examples, the figures and the claims.

DETAILED DESCRIPTION OF PREFERRED EMBODIMENTS

This invention discloses thin fluorinated films with low dielectric constants ("$\in$") that are useful in the manufacture of integrated circuits and other electronic devices. Manufacture of smaller and faster integrated circuits requires inter-metal dielectric (IMD) and inter-level dielectric (ILD) materials that minimize the communication of electrical signals between adjacent conductive lines, referred to as the interconnects. Low dielectric constant materials are useful to minimize "crosstalk" within and between layers of integrated circuits in addition to serve many other purposes.

The polymers prepared from the precursors of the present invention contain a high degree of substitution of hydrogen atoms by fluorine atoms. In these polymers, the fluorine in the aromatic ring provides the low dielectric constant below about 2.6 and molecular rigidity. This rigidity is reflected by high glass transition temperature (Tg), high elastic modulus (E) and high shear modulus (G). Their elastic modulus is above about 2.5, and mostly is above 3.5 GPa.

Films made from Parylene AF44™ have a dielectric constant of 2.28 and have increased thermal stability compared many different dielectric materials. However, there are disadvantages to the known methods the manufacture of Parylene AF44™. Despite these disadvantages, it is important to understand the advantages of such polymer in order to produce the next generations of thin films. Although not wanting to be bound by theory, the thermal stability of the Parylene AF44™ is due to the higher bonding energies of the $sp^2C$=$sp^2C$, $sp^2C$—H and $sp^2C$-$sp^3C$ bonds of 145, 111 and 102 kcal/mol respectively. In addition, the $sp^3C$—F bonds may also be involved in hyperconjugation with $sp^2C$=$sp^2C$ double bonds of the adjacent phenylene groups in Parylene AF44™. This hyperconjugation renders a higher bond energy for the $sp^3C$—F bonds than are found in non-hyperconjugated $sp^3C$—F bonds.

Thus, polymers consist of $sp^2C$=$sp^2C$, $sp^2C$—F and hyperconjugated $sp^3C$—F bonds confer advantages, whereas other types of bonds (such as $sp^3C$—F and $sp^3C$—H bonds) do not confer these advantages. The $sp^2C$=$sp^2C$ and other $sp^2C$ bonds increase the mechanical strength and increase Td (Decomposition Temperature) of the polymers. The fluorine atoms on the aromatic moieties of the polymers of this invention decrease the dielectric constant and the $sp^2C$—F and hyperconjugated $sp^3C$—F bonds confer greater thermal stability to these polymers. In contrast, polymers that do not contain these types of bonds have lower thermal stability and higher dielectric constant.

One embodiment of the present invention pertains to fluorinated precursors and processes for making thin polymer films that have low-dielectric constant and have improved dimensional stability, and are stable at high temperatures. In particular, this invention relates to novel fluorinated precursors and the methods to process these fluorinated precursors. These polymers have a dielectric constant $\in$ equal to or less than 2.7, thus are useful in the fabrications of ICs. The present invention preferably uses the spin on method to dispense the fluorinated precursors onto the wafer.

Broadly, one aspect of the present invention pertains to a thin film with a low dielectric constant by co-polymerization of an ethylenic-containing precursor (Ia) with a benzocyclobutane (IIa')-, a biphenyl (IIb')- or a dieneone (IIc')- containing precursor, or their admixture. The ethylenic-containing precursor (Ia) can have the following general structure:

   (Ia)

wherein, W is —H, —F or fluorinated phenyl; n° is an integer of 2, and Z is a moiety containing an ethylenic (C≡C) group.

P can be —$C_6H_{4-n}F_n$— (n=0 to 4); —$C_6H_{4-n}F_n$—$CF_2$—$C_6H_{4-n}F$— (n=0 to 4); —$C_{10}H_{6-n}F_n$— (n=0 to 6), or —$C_{12}H_{8-n}F_n$— (n=0 to 8).

The benzocyclobutane-containing precursor can have the following general structure (IIa'):

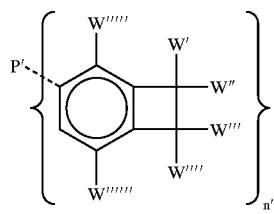   (IIa')

wherein W', W'', W''', W'''', W''''', and W'''''' are independently the same or different and are fluorinate phenyl, —F or —H, n' is an integer of 2. P' can be —$C_6H_{4-n}F_n$-(n=0 to 4); —$C_6H_{4-n}F_n$—$CF_2$—$C_6H_{4-n}F_n$— (n=0 to 4); —$C_{10}H_{6-n}F_n$— (n=0 to 6), or —$C_{12}H_{8-n}F_n$— (n=0 to 8).

The diphenyl containing precursors can have the following general structures (IIb'):

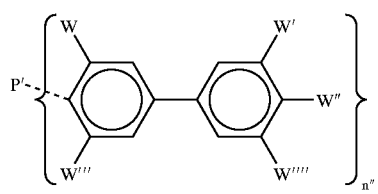   (IIb')

wherein each W is fluorinate phenyl, —F or —H, n'' is an integer of at least 2 to a number that is less than total $sp^2C$ substitutions on P'. P' can be —$C_6H_{4-n}F_n$— (n=0 to 4); —$C_6H_{4-n}F_n$—$CF_2$—$C_6H_{4-n}F_n$— (n=0 to 8); —$C_{10}H_{6-n}F_n$— (n=0 to 6), or —$C_{12}H_{8-n}F_n$— (n=0 to 8).

The dieoneone-containing precursors can have the following general structures (IIc'):

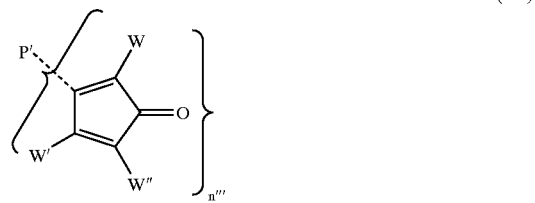   (IIc')

wherein each W is fluorinate phenyl, —F or —H, n''' is an integer of at least 2 to a number that is less than total $sp^2C$ substitutions on P'. P' can be —$C_6H_{4-n}F_n$— (n=0 to 4); —$C_6H_{4-n}F_n$—$CF_2$—$C_6H_{4-n}F_n$— (n=0 to 8); —$C_{10}H_{6-n}F_n$— (n=0 to 6), or —$C_{12}H_{8-n}F_n$— (n=0 to 8).

Pinhole-free thin films can be prepared by the following steps:

Precursor molecules, such as ethylenic (Ia) with benzocyclobutane (IIa'), biphenyl (IIb'), or dieneone (IIc'), or their mixture are first dissolved or suspended in an appropriate solvent. This mixture or suspension is then dispensed onto the surface of interest by the spin-on technique, which results in a thin wet film. The thin wet film is then heated at 3 to 5° C. per minute to a predefined maximum temperature, $T_{max}$. Thus, the wet film is heated from 5 to 50° C. below the boiling point of the solvent. The resultant film is then heated at 10° C. per minute to a maximum temperature, $T_{max}$ that ranges from 10 to 20° below the glass transition temperature ("Tg") of the thin film. A thin film according to this invention has a dielectric constant of less than 2.6, preferably less than 2.4. Thus, thin film derived from polymerization of precursors (IIa', IIb' or/and IIc') with precursor (Ia) are useful for the manufacture of ICs, active matrix LCDs or a fiber optic device. In addition, this invention will provide thin films that are compatible with the Dual Damascene process used in manufacturing of future ICs.

The heating and curing processes described in the above should preferably conducted under non-oxidative, inert conditions to prevent oxidation of prepolymers. Ideally, the processes should be conducted under nitrogen or vacuum condition on hot plate and inside an oven. The final heating or curing process should be at least 5 to 10 minutes if conducted on a hot plate, and should be at least 20 to 30 minutes if conducted inside an oven. The final cure temperature should be at least reaching to 5 to 10° C. below its maximum achievable Tg, Tg(max). From a practical point of view, Tg(max) is defined here for the Tg that can be obtained by heating the dielectric inside a sample cell in DSC (Differential Scanning Calorimeter) to 450° C. at 10° C. per minute heating rate under nitrogen atmosphere. The Tg(max) can be obtained by re-scanning the dielectric material inside the sample cell under the same conditions.

Set forth in the following illustrations are polymerization reactions useful to create the low ∈ thin films from the above precursors (Ia with IIa', IIb' and IIc') of this invention:

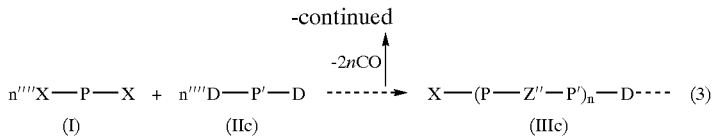

(3)

wherein, n'''' is an integer of at least 10, preferably 20.

P and P' can be the same for each of the above reactions. P and P' is independently an aromatic moiety, preferably a fluorinated aromatic moiety, containing compound. The aromatic moiety includes, but is not limited to:

—$C_6H_{4-n}F_n$— (n=0 to 4), such as —$C_6H_4$— and —$C_6F_4$—; —$C_6H_{4-n}F_n$—$CF_2$—$C_6H_{4-n}F_n$— (n=0 to 4); napthyenyl moiety, —$C_{10}H_{6-n}F_n$— (n=0 to 6), such as —$C_{10}H_6$— and —$C_{10}F_6$—; di-phenyl moiety, —$C_{12}H_{8-n}F_n$— (n=0 to 8), such as —$C_6H_2F_2$—$C_6H_2F_2$— and —$C_6F_4$—$C_6H_4$—; anthracenyl moiety, —$C_{12}H_{8-n}F_n$—; phenanthrenyl moiety, —$C_{14}H_{8-n}F_n$—; pyrenyl moiety, —$C_{16}H_{8-n}F_n$— and more complex combinations of the phenyl and naphthenyl moieties, —$C_{16}H_{10-n}F_n$—. The aromatic moieties could include isomers of various F substitutions and reaction groups (X,Y,Ar' & D).

Thus, P and P' can be an aromatic moiety-containing compounds of the following general structures:

—Ar-L-AR'-, wherein Ar and Ar' is selected from P or P'. L is a linkage unit such as —O—$CH_2$—O—, —O—$CF_2$—O—, —Si(R)$_2$—O—Si(R)$_2$, —O—, —CO—, —$SO_2$—, or —O—Ar—O— groups, and is preferably a —$CF_2$— group. R can be an aromatic radical, an alkyl radical, —$CH_3$, or preferably a —$CF_3$.

Compounds P and P', by definition, can be simple organic compounds, oligomers or polymers. An oligomer is a molecule consisting of many (2 to 10) repeating units in its backbone structure whereas a polymer is a macromolecule consisting of more than 10 to 20 repeating units in its backbone structure.

X in the above compound (I) is an acetylenyl radical, such as —C≡C—W, wherein W is a fluorinate phenyl, —H or —F. (Note that in (Ia), -Z-W equals to —X and n=2 in (I)).

Y in the above compound (IIa) is a benzocyclobutane radical of the following structure (IV):

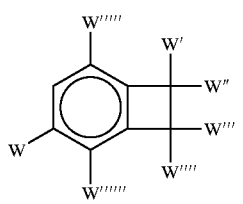

(IV)

wherein each W is a fluorinate phenyl, —F or —H.

Ar' in (IIb) is a biphenyl radical of the following structure (V):

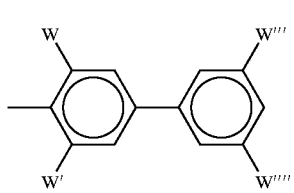

(V)

wherein each W is a fluorinate phenyl, —H or —F.

D in the above compound (IIC) is a dieneone radical of the following structure

(VI)

wherein each W is a fluorinate phenyl, —H or —F.

According to the above reactions, Z is the repeating chemical structure of the following structure (VII) for the reaction (1):

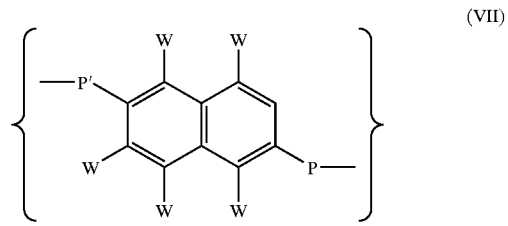

(VII)

Z' is (VIII) for the reaction (2):

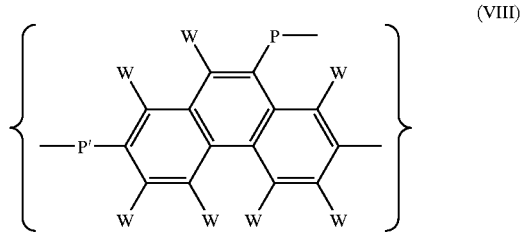

(VIII)

Z" is (IX) for the reaction (3).

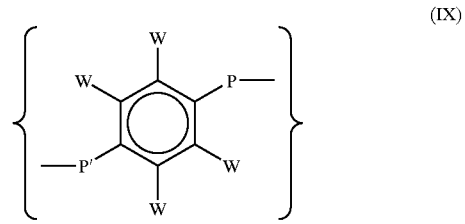

(IX)

The disclosed invention also includes precursors (Ia', IIa', IIb' and IIc') consisting of more than two functional groups (X, Y, Ar' and D in I, IIa, IIb and IIc; when n°, n', n", or n'"

is greater than 2). When precursors consisting of more than two functional groups are used in preparations of thin films, it is desirable to balance the total number of functional groups in (Ia, n°>2) with that of (IIa', IIb' or IIc'; n', n'', or n''' is greater than 2). Although not wanting to be bound by theory, the ratio of the total number of functional groups in (Ia) to that in (II) should be in the range from 0.85 to 1.20, preferably between 0.9 to 1.1. In these cases, better cross-linked polymer thin films will result.

In order to achieve a dielectric constant of 2.7 or lower, the above referenced precursors should consist of a sufficient amount of F substitution to H in their $sp^2C$—H and $sp^3C$—H bonds. Further, in order to achieve thermal stability and higher rigidity, the above referenced precursors should consist of a substantial amount of F substitution to H in their $sp^3C$—H bonds. In general, all $sp^3C$—H should be replaced with F in order to achieve the thermal stability required in IC fabrication. The immediately foregoing does not apply to precursors that include a $sp^3C_\alpha$—H bond, wherein $C_\alpha$ is an alpha carbon connecting to an aromatic group. According to hyper-conjugation principle, the $sp^3C_\alpha$—H bond is substantially more thermally stable than that of a $sp^3C$—H bond. However, to achieve a dielectric constant $\in$ <2.4, the total amount of F substitution to H can be estimated as follows.

It is known that without any F substitution to H for the above precursors (Ia) and (IIa', IIb' and IIc'), the resulting dielectric will have a constant $\in$ of about 2.65 to 2.75. However, when each C—H bond is replaced with C—F bond, the constant $\in$ of the resulting polymer will be lowered at 0.05 to 0.07 per substitution with a limiting lowest $\in$ of about 1.9. Therefore, the ratio of $(sp^2C$—F+$sp^3C$—F$)/(sp^2C$—F+$sp^3C$—F+$sp^2C$—H+$sp^3C$—H$)$ of resulting thin films should be at least 0.4, preferably 0.7.

To make thin films from the above referenced precursors (I and IIa, IIb and IIc), in general, such precursors are spin coated onto the wafer. The wet film is then conditioned under slow heating rates (3 to 5° C./minute) to remove most (80 to 90%) of the solvent(s). The resulting dry films are then exposed to polymerization conditions that normally have various time-temperature-heating rate schedules.

Under proper processing conditions, solid, "pinhole-free" thin films useful for fabrication of ICs can be obtained for polymers (IIIa and IIIb). To obtain "pinhole-free" thin films, solvent-drying temperatures are generally need to be at least 20 to 50° C. below the boiling temperature of the solvent. In addition, it is desirable to heat the wet film under an inert gas such as nitrogen. Polymerization can then be carried out by heating the resulting wet films slowly from (Tb-20 to 50) to (Tg-T) ° C. Wherein, Tg is the attainable glass transition temperature for a given polymer and T ranges from 20 to 50° C. Preferably, (Tg-T) preferably should not exceed 450° C. When (Tg-T) approaches 400 to 450° C., the heating time should be less than 30 to 60 minutes under such temperatures. During polymerization, the heating rate normally ranges from 20 to 30° C./minute depending on the thickness of the films. For making thin films (<1–2 μm), heating rate can be as high as 40 to 50° C./minute.

A more restrictive and controlled drying and cure procedure is necessary to obtain "pinhole-free" thin films for polymer IIIc. Due to the generation of carbon monoxide during polymerization, thin films of various porosity and pore sizes may result. For example, as noted herein, if the polymerization is carried out for a very dry film under a slow heating rate (5 to 10° C./minute), "pinhole free" thin film can be obtained. However, if polymerization reactions are carried out at temperatures that are higher than the soft temperatures of polymer chains inside the wet films, thin films with porosity will result. Therefore, in principle, thin films with various porosity and pore sizes can be obtained by manipulating the polymerization conditions or weight % of a solvent in a given film. Generally, pore size distribution is uniform, since it is controlled from polymerization reactions that only occur at chain ends. This is different from other conventional methods that used co-solvents or low thermally stable inclusions (or sacrificing materials) to generate porous dielectrics.

The invention includes novel precursors containing a fluorinated aromatic moiety. The precursors are suitable for making thin films with low dielectric constants and high thermal stability. Additionally, the invention includes methods for applying thin films of this invention for various electronic devices. Therefore, integrated circuits, liquid crystal displays or fiber optic devices consist of these thin films should have improved electrical and mechanical performances.

It should be appreciated by those of ordinary skill in the art that other embodiments may incorporate the concepts, methods, precursors, polymers, films, and devices of the above description and examples. The description and examples contained herein are not intended to limit the scope of the invention, but are included for illustration purposes only. It is to be understood that other embodiments of the invention can be developed and fall within the spirit and scope of the invention and claims.

We claim:

1. A dielectric thin film prepared by polymerizing an ethylenic-containing precursor with a biphenyl-containing precursor.

2. The dielectric thin film of claim 1, wherein the ethylenic-containing precursor has a general structure of:

$$P\text{-}(\text{-}Z\text{-}W)_{n°} \qquad (Ia);$$

wherein W is hydrogen, fluorine or a fluorinated phenyl;

P is an aromatic-moiety with a general structure of
—$C_6H_{4-n}F_n$— (n =0 to 4); —$C_6H_{4-n}F_n$—$CF_2$—$C_6H_{4-n}F_n$— (n=0 to 8); —$C_{10}H_{6-n}F_n$— (n=0 to 6), or —$C_{12}H_{8-n}F_n$—(n=0 to 8);

Z is a moiety having an ethylenic group; and n° is an integer of at least 2, but is less than total $sp^2C$ substitutions on the P aromatic-moiety.

3. The dielectric thin film of claim 1, wherein the biphenyl containing precursor has a general structure of:

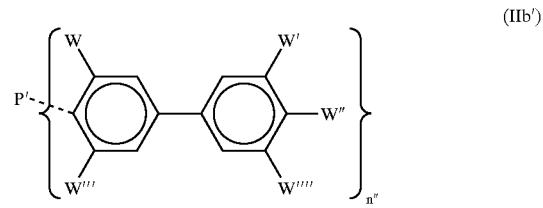

(IIb')

wherein W is hydrogen, fluorine or a fluorinated phenyl;

P' is an aromatic-moiety with a general structure of
—$C_6H_{4-n}F_n$— (n=0 to 4); —$C_6H_{4-n}F_n$—$CF_2$—$C_6H_{4-n}F_n$— (n=0 to 8); —$C_{10}H_{6-n}F_n$— (n=0 to 6), or —$C_{12}H_{8-n}F_n$— (n=0 to 8); and n'' is an integer of at least 2, but is less than total $sp^2C$ substitutions on the P' aromatic-moiety.

4. The dielectric thin film of claim 1, wherein the dielectric thin film has a dielectric constant ($\in$) value equal to or less than 2.6.

5. The dielectric thin film of claim 1, wherein one or more layers of the thin film is deposited on an integrated circuit ("IC") or an electronic device.

6. The dielectric thin film of claim 5, wherein the electronic device comprises an active matrix liquid crystal display, or a fiber optic device.

7. The dielectric thin film of claim 5, wherein the IC is manufactured via a dual damascene process comprising the dielectric thin film.

8. A dielectric thin film prepared by polymerizing an ethylenic-containing precursor with a dieneone-containing precursor.

9. The dielectric thin film of claim 8, wherein the ethylenic-containing precursor has a general structure of:

$$P\text{-}(\text{-}Z\text{-}W)_{n°} \qquad (Ia);$$

wherein W is hydrogen, fluorine or a fluorinated phenyl;

P is an aromatic-moiety with a general structure of —$C_6H_{4-n}F_n$— (n=0 to 4); —$C_6H_{4-n}F_n$—$CF_2$—$C_6H_{4-n}F_n$— (n=0 to 8); —$C_{10}H_{6-n}F_n$— (n=0 to 6), or —$C_{12}H_{8-n}F_n$— (n=0 to 8);

Z is a moiety having an ethylenic group; and n° is an integer of at least 2, but is less than total $sp^2C$ substitutions on the P aromatic-moiety.

10. The dielectric thin film of claim 8, wherein the dieneone-containing precursor has a general structure of:

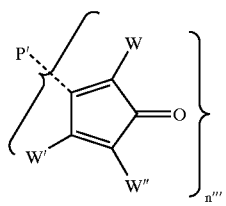

(IIc')

wherein W is hydrogen, fluorine or a fluorinated phenyl;

P' is an aromatic-moiety with a general structure of —$C_6H_{4-n}F_n$— (n=0 to 4); —$C_6H_{4-n}F_n$—$CF_2$—$C_6H_{4-n}F_n$— (n=0 to 8); —$C_{10}H_{6-n}F_n$— (n=0 to 6), or —$C_{12}H_{8-n}F_n$— (n=0 to 8); and n''' is an integer of at least 2, but is less than total $sp^2C$ substitutions on the P' aromatic-moiety.

11. The dielectric thin film of claim 8, wherein the dielectric thin film has a dielectric constant (s) value equal to or less than 2.6.

12. The dielectric thin film of claim 8, wherein one or more layers of the thin film is deposited on an integrated circuit ("IC") or an electronic device.

13. The dielectric thin film of claim 12, wherein the electronic device comprises an active matrix liquid crystal display or a fiber optic device.

14. The dielectric thin film of claim 12, wherein the IC is manufactured via a dual damascene process comprising the dielectric thin film.

15. A method of making a dielectric thin film material, comprising:

(a) dissolving or suspending precursors in a solvent to give a solution or suspension of the precursors in the solvent;

(b) spinning the solution or the suspension of the precursors in the solvent onto a substrate to form a thin wet film;

(c) heating the thin wet film to a temperature that is below a boiling-temperature of the solvent to remove most of the solvent from the thin wet film to form a thin dried film; and (d) heating the thin dried film to a temperature that is below a glass-transition temperature of the thin dried film to give the dielectric thin film material.

16. The method of claim 15, wherein a rate of heating the wet film occurs at 3 to 5° C. per minute to a maximum temperature that is below the boiling-temperature of the solvent.

17. The method of claim 16, wherein the wet thin film is heated to a maximum temperature that ranges from 5 to 50° C. below the boiling-temperature of the solvent.

18. The method of claim 15, wherein a rate of heating the thin dried film occurs at 10° C. per minute to a maximum temperature that is below the glass-transition temperature of the thin dried film.

19. The method of claim 18, wherein the thin dried film is heated to a maximum temperature that ranges from 10 to 20° C. below the glass-transition temperature of the thin dried film.

* * * * *